United States Patent [19]

Peer et al.

[11] 3,980,821
[45] Sept. 14, 1976

[54] POWER SUPPLY FOR A TELEVISION RECEIVER

[75] Inventors: John Charles Peer; David Warren Luz, both of Indianapolis, Ind.

[73] Assignee: RCA Corporation, New York, N.Y.

[22] Filed: Aug. 29, 1975

[21] Appl. No.: 609,319

[52] U.S. Cl. .................. 178/7.5 R; 178/DIG. 11; 315/364
[51] Int. Cl.² .................. H04N 3/18; H04N 5/44
[58] Field of Search .................. 178/7.5 R, DIG. 11, 178/7.3 R; 321/14; 315/364, 106, 107; 323/22 R

[56] References Cited
UNITED STATES PATENTS

| | | | |
|---|---|---|---|
| 3,766,314 | 10/1973 | Riechmann | 178/DIG. 11 |
| 3,796,827 | 3/1974 | Riechmann | 178/DIG. 11 |
| 3,828,239 | 8/1974 | Nagai et al. | 178/7.5 R X |
| 3,916,288 | 10/1975 | Hicks et al. | 178/7.5 R X |

*Primary Examiner*—Robert L. Griffin
*Assistant Examiner*—Mitchell Saffian
*Attorney, Agent, or Firm*—Eugene M. Whitacre; Paul J. Rasmussen

[57] ABSTRACT

A power supply which produces a pulsating direct current potential from a first source of alternating current potential and provides a direct current potential to a means for developing a viewable display on a kinescope utilizes a filter network which includes a first inductor. The first inductor provides for a relatively constant level of direct current potential to the means for developing a viewable display with a predetermined range of direct current being supplied to the means for developing a viewable display and a relatively constant level of pulsating direct current potential. A second inductor magnetically coupled to the first inductor and the means for developing a viewable display provides a second alternating current potential greater than a predetermined level to the means for developing a viewable display. The second alternating current potential level decreases to a level below the predetermined level when the inductance of the first inductor decreases to a value less than the predetermined inductance level, thereby rendering the kinescope unviewable.

9 Claims, 7 Drawing Figures

FIGURE 1

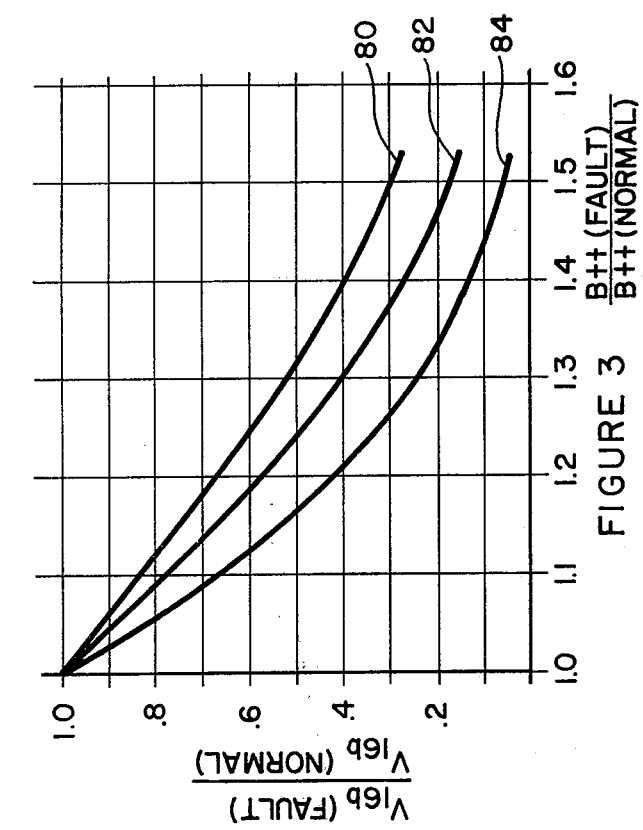
FIGURE 3
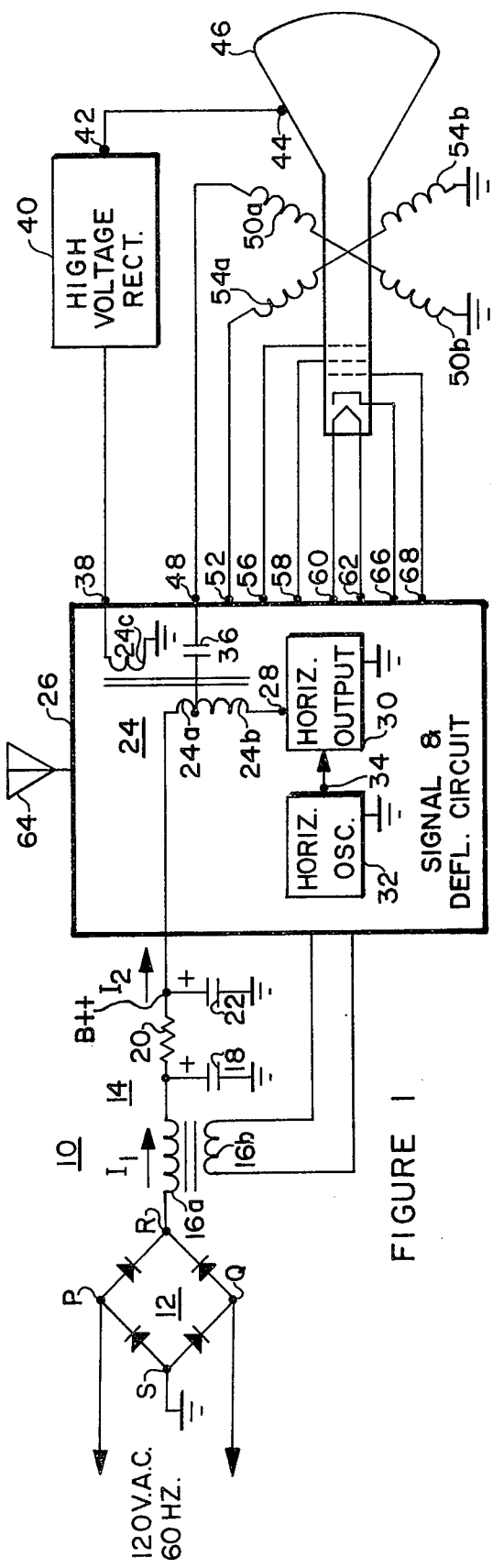
FIGURE 1
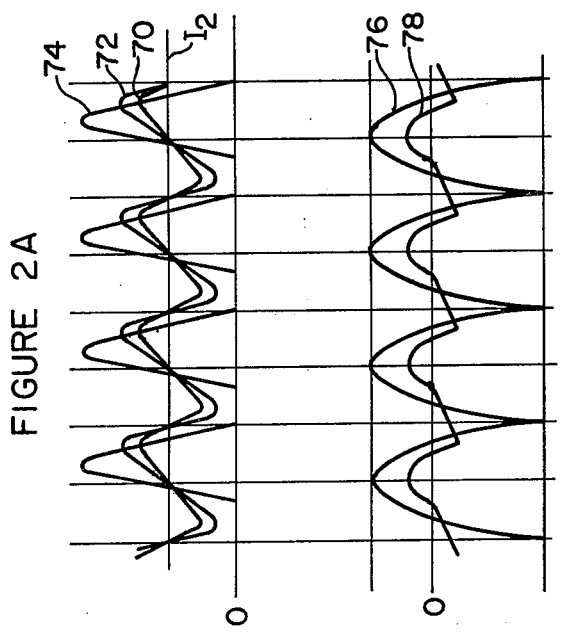
FIGURE 2A
FIGURE 2B

POWER SUPPLY FOR A TELEVISION RECEIVER

BACKGROUND OF THE INVENTION

This invention relates to a power supply for a television receiver.

Various power supply circuits have been utilized in television receivers. One such power supply circuit utilizes a rectifier adapted to be coupled to a source of alternating current voltage to produce a pulsating direct current voltage. A choke input filter coupled to the rectifier provides a direct current voltage having a suitable ripple factor required by a circuit which is used in the production of, for example, high voltage required at the ultor electrode of the kinescope tube.

In certain applications, the choke input filter is preferred over a capacitance input filter for the following reasons: (1) a low ripple factor direct current voltage having a magnitude less than the peak voltage of the source of alternating current potential is developed without a power transformer and without high power dissipation, (2) direct current voltage remains relatively constant throughout a predetermined range of load current, and (3) direct current voltage is virtually independent of filter capacitance values.

The choke input filter, however, has one disadvantage. That is, if the choke inductance is reduced by shorted turns or the choke being externally shorted resulting in an increase in the direct current voltage produced at the output of the choke input filter, thereby increasing the high voltage to the kinescope without rendering kinescope unviewable, there is a possibility of exposure of the viewer to X-ray radiation in excess of 0.5 mR/hr (HEW prescribed isoexposure limit). If, however, the kinescope is rendered unviewable when the choke inductance decreases below a predetermined level, the viewer will be encouraged not to continue to operate the television receiver, thereby protecting him from the increased X-ray radiation.

SUMMARY OF THE INVENTION

A power supply for a television receiver including means for developing a viewable display on a kinescope comprises a rectifying means adapted to be coupled to a first source of alternating current potential for developing a pulsating direct current potential. Means, including a first inductor, coupled to the rectifying means and the means for developing a viewable display filters the pulsating direct current potential to provide a first source of direct current potential to the means for developing a viewable display. The first inductor has a predetermined inductance value and provides for a relatively constant level of the direct current potential with a predetermined range of direct current being supplied to the means for developing a viewable display and a relatively constant level of pulsating direct current potential. A second inductor magnetically coupled to the first inductor and coupled to the means for developing a viewable display provides a second alternating current potential, greater than a predetermined level, to said means for developing a viewable display. The second alternating current potential level decreases to a level below the predetermined level when the inductance of the first inductor decreases to a value less than the predetermined inductance value for rendering the kinescope unviewable.

A more detailed description of a preferred embodiment of the invention is given in the following detailed description and accompanying drawings of which:

FIG. 1 is a schematic diagram, partially in block form, of a television receiver embodying the invention;

FIGS. 2A and 2B illustrate waveforms of the current and voltage at various points in the schematic diagram of FIG. 1;

FIG. 3 is a series of curves showing the interrelationship of the change in two critical voltages in the schematic diagram of FIG. 1.

DESCRIPTION OF THE INVENTION

Figure 4:
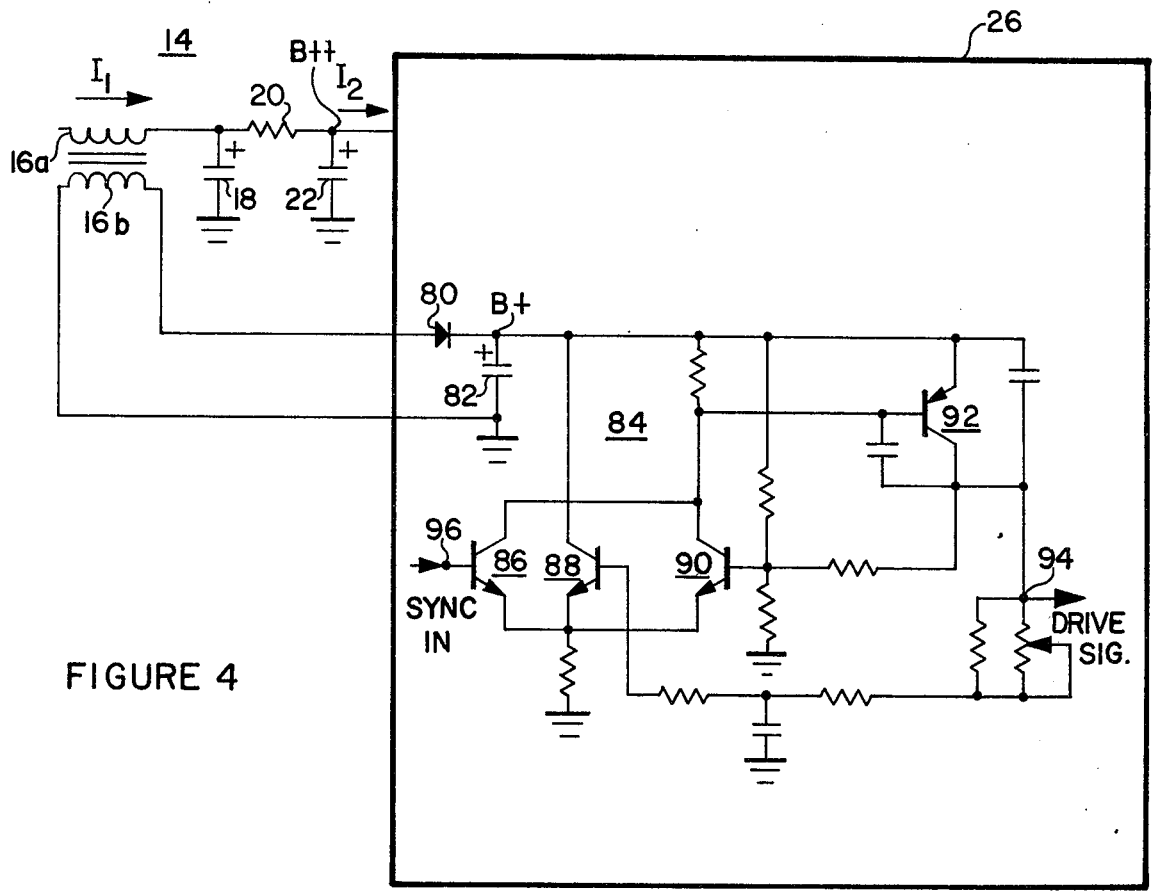
FIGS. 4–6 illustrate several embodiments of a portion of the signal and deflection circuit of FIG. 1 not shown in FIG. 1.

In FIG. 1, a source of alternating current voltage (not shown) is coupled to terminals P and Q of a bridge rectifier 12. Terminal S of bridge rectifier 12 is coupled to a point of reference potential. A pulsating direct current potential is developed between terminal R of bridge rectifier 12 and reference potential. A choke input filter 14 comprises a series combination of a choke coil 16a and a filter capacitor 18 coupled between terminal R and reference potential and a series combination of a resistor 20 and a filter capacitor 22 coupled between the junction of choke coil 16a and filter capacitor 18 and reference potential. The junction of resistor 20 and filter capacitor 22 provides a source of filtered direct current potential (B++).

The choke coil 16a provides for a relatively constant level of B++ throughout a predetermined range of direct current flow from B++ to reference with a relatively constant amplitude alternating current potential applied to the bridge rectifier 12.

Signal processing and deflection system 26 includes a horizontal oscillator 32 which develops a signal at output terminal 34 which is coupled to a horizontal deflection output circuit 30, thereby providing for control of the current flowing from B++ through windings 24a and 24b of a high voltage transformer 24 and deflection output circuit 30 to reference potential. A first terminal of a winding 24c is coupled to reference potential and another terminal is coupled to terminal 38 such that during operation a horizontal retrace pulse is developed at terminal 38 with respect to reference potential.

The pulse at terminal 38 is coupled to a high voltage rectifier 40 and rectified, thereby producing a high voltage direct current potential at an output terminal 42 of high voltage rectifier 40. The output terminal 42 is coupled to the ultor electrode 44 of a kinescope tube 46, thereby providing for the desired acceleration of the beam of electrons produced within the kinescope tube 46.

The pulse produced at the junction of windings 24a and 24b is coupled through an S-shaping capacitor 36 to a terminal 48. Terminal 48 is coupled through the horizontal yoke windings 50a and 50b to reference potential. Current flow through yoke windings 50a and 50b provides for horizontal deflection of the electron beam within the kinescope tube 46.

Waveforms of the current through choke coil 16a under various conditions, identified as $I_1$ in FIG. 1, are shown in FIG. 2A. The average load current from B++, identified as $I_2$ in FIG. 1, is also shown in FIG. 2A. Waveform 70 indicates current $I_1$ when the inductance of choke coil 16a is very much greater than a minimum inductance defined by the following formula: $L_{MIN} =$ $R_L/6\pi f_{AC\ line}$. waveform 72 indicates a current $I_1$ with a slight reduction in the inductance of choke coil 16a (i.e., very few shorted turns) but with an inductance greater than $L_{MIN}$. Waveform 74 indicates a current $I_1$ when the inductance of choke coil 16a less than $L_{MIN}$ (i.e., a large number of shorted turns). With an inductance less than $L_{MIN}$, the current through coil 16a is zero during certain intervals as shown in waveform 74.

As long as the inductance of choke coil 16a is greater than $L_{MIN}$, the voltage produced across winding 16b is as shown in waveform 76 of FIG. 2B. When the inductance of choke coil 16a reduces to a value less than $L_{MIN}$, the peak-to-peak amplitude of the voltage produced across winding 16b decreases. Waveform 78 indicates one peak-to-peak voltage condition across winding 16b with a reduction of the inductance of choke coil 16a below $L_{MIN}$.

FIG. 3 is a plot of the interrelationship of the change in B++ and the change in voltage across winding 16b with different degrees of the reduction of the inductance of choke coil 16a. The curve 80 indicates the effect of various degrees of reduction of the inductance of choke coil 16a on the positive peak of the voltage produced across winding 16b. The curve 82 indicates the effect on the RMS voltage produced by winding 16b with various degrees of reduction of the inductance of choke coil 16a. Curve 84 indicates the reduction in the negative peak of voltage produced by winding 16b with various degrees of reduction of the inductance of choke coil 16a.

Figure 5:
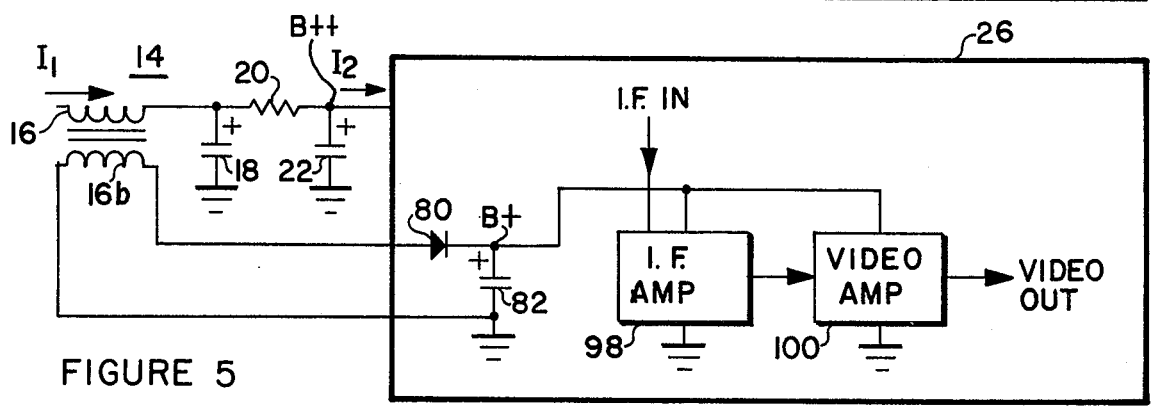
Figure 6:
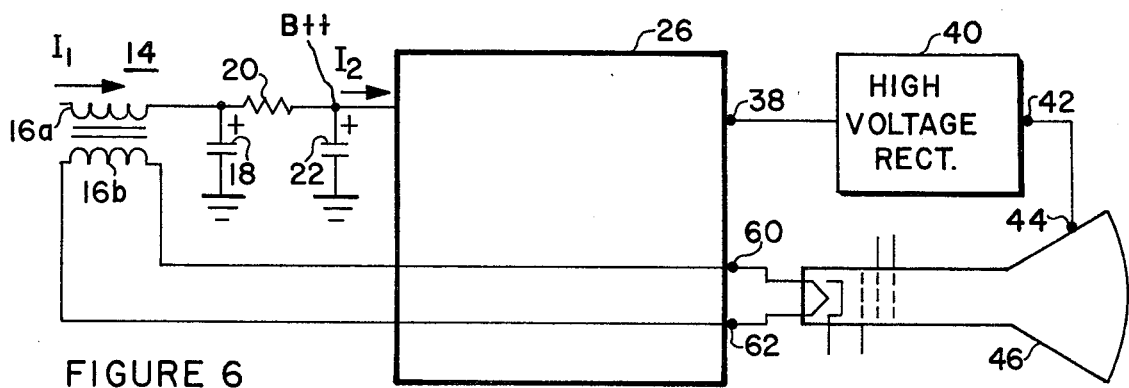

The winding 16b is coupled to the signal and deflection circuit 26 and provides for proper operation of various segments of the signal and deflection circuit 26 when specific characteristics (i.e., positive peak, RMS voltage and negative peak) of the voltage produced by winding 16b exceed a predetermined level, in a manner to be described in conjunction with FIGS. 4–6.

When B++ is being developed and the voltage developed by winding 16b is in excess of the predetermined level, vertical deflection signals are developed at an output terminal 52 of signal and deflection circuit 26 and provide for current flow through vertical deflection windings 54a and 54b, thereby providing for vertical deflection of the electron beam produced by the kinescope tube 46. Also, voltages are developed at terminals 56, 58, 60, 62, 66 and 68 which provide for a desired beam current within the kinescope tube 46.

Electromagnetic signals coupled to an antenna 64, which is coupled to the signal and deflection circuit 26, provide for modulation of the voltages at terminals 66 and 68 required to produce the electron beam current modulation within the kinescope tube 46 necessary to provide the desired light intensity modulation on the screen of the kinescope 46 in order to reproduce the picture information contained in the composite video signal.

FIG. 4 is a schematic diagram of a first embodiment of a portion of the signal and deflection circuit 26 of FIG. 1 not shown in FIG. 1. A first terminal of winding 16b is coupled to reference potential and another terminal of winding 16b is coupled to the anode of a diode 80. The cathode of diode 80 is coupled through a filter capacitor 82 to reference potential. The cathode of diode 80 provides a source of direct current potential (B+).

The cathode of diode 80 is coupled to a deflection oscillator 84 which comprises a transistor 86, transistor 88, transistor 90, and a transistor 92 which provide a drive signal at terminal 94 which may be utilized to drive either the horizontal deflection output circuit or the vertical deflection output circuit of the signal and deflection circuit 26. Proper phasing of the signal at output terminal 94 is accomplished by means of synchronizing signals derived from the composite video signal and coupled to the sync input terminal 96. By proper selection of component values associated with the transistors 86–92, the deflection oscillator 84 can be made to cease the production of signals at terminal 94 or produce insufficient drive for the deflection output circuit when the voltage produced by winding 16b drops below a predetermined level. With no signals, or signals not providing sufficient drive, the kinescope is rendered unviewable.

FIG. 5 is a second embodiment of a portion of the signal and deflection circuit 26 of FIG. 1 not shown in FIG. 1. B+ is produced by the rectification of the voltage produced by winding 16b in the same manner as shown in FIG. 4. B+, however, is utilized in a different manner to render the kinescope 46 unviewable when the voltage produced by winding 16b drops below a predetermined level. B+ is coupled to an IF amplifier 98 and a video amplifier 100. When the voltage produced by winding 16b drops below a predetermined level, the level of B+ is insufficient to provide for normal operation of IF amplifier 98 and the video amplifier 100. Therefore, signals coupled to the IF input terminal of the IF amplifier are not coupled through the IF amplifier and the video amplifier to the kinescope 46 of FIG. 1 by way of the video output terminal, thereby rendering the kinescope 46 unviewable.

FIG. 6 is a third embodiment of a portion of the signal and deflection circuit 26 of FIG. 1 not shown in FIG. 1. The winding 16b is coupled to terminals 60 and 62 of signal and deflection circuit 26. Terminals 60 and 62 are coupled to the filament of the kinescope tube 46 and provide for heating of the cathode electrode, thereby stimulating emission of electrons from the cathode surface and enhancing the beam current within the kinescope tube 46. As the inductance of the choke winding 16a decreases below $L_{MIN}$, B++ increases as shown in FIG. 3, thereby increasing the pulse amplitude at terminal 38 of signal and deflection circuit 26 which results in an increase of the high voltage produced at output terminal 42 of high voltage rectifier 40 and at the ultor electrode of the kinescope 46. An increase of the ultor electrode voltage with a given emission level from the cathode of the kinescope tube 46 increases the X-ray radiation produced by the kinescope tube. By coupling the winding 16b to the filament of the kinescope tube, the voltage produced by winding 16b decreases as the B++ voltage increases due to the reduction of the inductance of choke coil 16a, thereby reducing the temperature of the cathode of the kinescope 46 and reducing the beam current within the kinescope tube 46. By a proper choice of the operating conditions of the kinescope tube 46 and the components of the circuits of FIG. 6, the X-ray emission from the kinescope tube 46 can be maintained below a critical level.

As can be seen from an analysis of the aforementioned description of the various embodiments of the invention, the kinescope 46 can be rendered unviewable when the inductance of choke coil 16a is reduced by a failure (i.e., shorting of turns) which causes the high voltage applied to ultor electrode 44 to increase. By rendering the kinescope unviewable under this failure condition, the viewer is encouraged to turn the television receiver off, thereby reducing the likelihood of exposure of the viewer to excessive X-ray radiation.

What is claimed is:

1. In a television receiver, including means for developing a viewable display on a kinescope, a power supply comprising:

rectifying means adapted to be coupled to a first source of alternating current potential for developing a pulsating direct current potential;

means, including a first inductor, coupled to said rectifying means and said means for developing a viewable display for filtering said pulsating direct current potential to provide a first source of direct current potential to said means for developing a viewable display; said first inductor having a predetermined inductance value and providing for a relatively constant level of said direct current potential with a predetermined range of direct current being supplied to said means for developing a viewable display and a relatively constant level of pulsating direct current potential; and a second inductor magnetically coupled to said first inductor and coupled to said means for developing a viewable display for providing a second alternating current potential, greater than a first predetermined level, to said means for developing a viewable display; said second alternating current potential level decreasing to a level below said first predetermined level when the inductance of said first inductor decreases to a value less than said predetermined inductance value, for rendering said kinescope unviewable.

2. A power supply according to claim 1 wherein said means for filtering said pulsating direct current potential includes a capacitor, said level of said direct current potential being relatively independent of the capacitance value of said capacitor.

3. A power supply according to claim 2 wherein said means for developing a viewable display includes means, including a deflection oscillator, coupled to said second inductor for producing a second predetermined level of drive signal at an output terminal of said deflection oscillator when said second alternating current potential is greater than said first predetermined level; said drive signal decreasing to a level less than said second predetermined level when said second alternating current level decreases to a level less than said first predetermined level.

4. A power supply according to claim 3 wherein said means for producing a drive signal includes a first rectifying diode and a first filter capacitor coupled to said second inductor and said deflection oscillator for providing a second direct current potential to said deflection oscillator which is proportional to a first peak amplitude of said second alternating current potential.

5. A power supply according to claim 4 wherein said means for developing a viewable display includes a deflection output circuit means coupled to said means for producing a drive signal and said kinescope for producing a high direct current potential for said kinescope tube when said deflection oscillator produces said drive signal greater than said second predetermined level.

6. A power supply according to claim 5 wherein said means for developing a viewable display includes a deflection output circuit means coupled to said means for producing a drive signal and said kinescope for producing vertical deflection of a beam of electrons in said kinescope when said deflection oscillator produces said drive signal greater than said second predetermined level.

7. A power supply according to claim 2 wherein said means for developing a viewable display includes signal amplifying means adapted to be coupled to a source of signals, said second inductor and said kinescope for providing signal to said kinescope when said second alternating current potential is greater than said first predetermined level.

8. A power supply according to claim 7 wherein said means for developing a viewable display includes a second rectifying diode and a second filter capacitor coupled to said second inductor and said signal amplifying means for providing a third direct current potential to said signal amplifying means which is proportional to a first peak amplitude of said second alternating current potential.

9. A power supply according to claim 2 wherein said means for developing a viewable display includes means coupling said second inductor to the filament electrode of said kinescope for providing heating of said filament electrode sufficient to provide a viewable display on said kinescope when said second alternating current potential is greater than said first predetermined level.

* * * * *